United States Patent [19]

MacKenzie, Jr. et al.

[11] 4,421,890
[45] * Dec. 20, 1983

[54] FIRE RETARDING SYSTEM FOR POLYMERIC COMPOSITIONS, AND A METHOD AND PRODUCTS COMPRISING THE SAME

[75] Inventors: Burton T. MacKenzie, Jr., Monroe; Sidney Rothenberg, Fairfield, both of Conn.

[73] Assignee: General Electric Company, Schenectady, N.Y.

[ * ] Notice: The portion of the term of this patent subsequent to Sep. 23, 1992 has been disclaimed.

[21] Appl. No.: 336,241

[22] Filed: Dec. 31, 1981

Related U.S. Application Data

[60] Continuation of Ser. No. 869,256, Jan. 13, 1978, abandoned, which is a continuation of Ser. No. 725,324, Sep. 21, 1976, abandoned, which is a division of Ser. No. 585,069, Jun. 9, 1975, Pat. No. 4,022,945, which is a continuation-in-part of Ser. No. 400,830, Sep. 26, 1973, Pat. No. 3,908,068.

[51] Int. Cl.³ ............................ C08K 3/22; C08K 5/02

[52] U.S. Cl. ................................ 524/431; 524/371; 524/469

[58] Field of Search ................... 524/371, 469, 431

[56] References Cited

U.S. PATENT DOCUMENTS

| | | | |
|---|---|---|---|
| 3,075,944 | 1/1963 | Wick et al. | 260/45.75 B |
| 3,110,623 | 11/1963 | Feild | 260/42.42 |
| 3,202,567 | 8/1965 | Muri | 260/42.44 |
| 3,331,797 | 7/1967 | Kopetz et al. | 260/45.75 B |
| 3,622,537 | 11/1971 | Needham | 260/45.75 P |
| 3,908,068 | 9/1975 | MacKenzie | 260/42.45 |
| 3,922,459 | 11/1975 | Franz et al. | 428/297 |
| 3,928,210 | 12/1975 | Peterson | 260/29.2 EP |
| 3,941,758 | 3/1976 | Maul et al. | 260/45.75 P |

*Primary Examiner*—James H. Derrington
*Attorney, Agent, or Firm*—Paul E. Rochford

[57] ABSTRACT

An improved and economical fire retarding system for polymeric compositions comprising the combination of a halogen-containing hydrocarbon and an oxide of iron; a method of rendering polymeric compositions resistant to flame; and the flame resistant polymeric compositions and products comprising the same.

7 Claims, 1 Drawing Figure

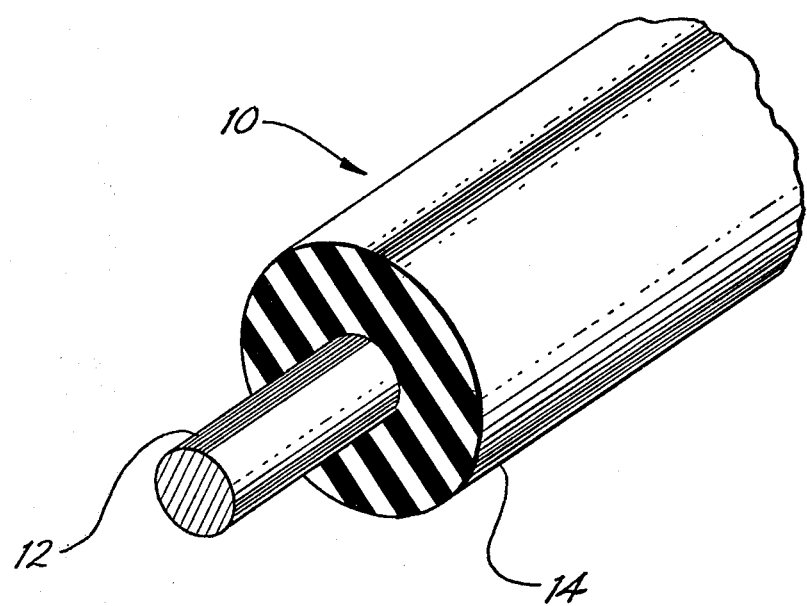

FIRE RETARDING SYSTEM FOR POLYMERIC COMPOSITIONS, AND A METHOD AND PRODUCTS COMPRISING THE SAME

This is a continuation of application Ser. No. 869,256, filed Jan. 13, 1978, now abandoned, which is a continuation of application Ser. No. 725,324, filed Sept. 21, 1976, now abandoned, which is a division of application Ser. No. 585,069, filed June 9, 1975, now U.S. Pat. No. 4,022,945 which is a continuation-in part of our previously filed application for patent Ser. No. 400,830, filed Sept. 26, 1973, now U.S. Pat. No. 3,908,068.

BACKGROUND OF THE INVENTION

Fire retarding systems based upon the combination of halogen-containing materials with antimony compounds such as oxides or halides of antimony have heretofore been extensively utilized to impart resistance to flame and combustion in polymeric compositions and other materials. For example, U.S. Pat. No. 2,480,298 of Aug. 30, 1949, teaches the use of at least 6 percent by weight of a chlorinated hydrocarbon in combination with 20 to 35 percent by weight of antimony trioxide as a flame proofing agent or system for polyethylene compositions.

The need for obtaining more effective resistance to flame or fire in polymeric products and other materials, moreover, has prompted efforts to improve this basic system of combinations of halogenated materials and antimony compounds such as are disclosed in U.S. Pat. Nos. 3,582,518; 3,740,245; and 3,741,893. Other recent patents, including U.S. Pat. Nos. 3,340,226 and 3,705,128, have proposed the use of a variety of metal compositions, such for example, as tin and zinc compounds, as substitutes or supplements for antimony compounds in halogen-containing fire retarding systems as a means of enhancing resistance to flame and overcoming shortcomings of the basic system.

SUMMARY OF THE INVENTION

The present invention involves the discovery of an improvement in those basic and conventional fire retarding systems which contain a halogen material and an antimony compound, and it comprises the replacement of the antimony compound, or its equivalent metal compound in the system, with a more effective and economical component, namely, an oxide of iron. Accordingly, this invention includes novel and more effective fire retarding systems composed of new and improved combinations of more economical ingredients and the resultant compositions and the method of obtaining such compositions.

OBJECTS OF THE INVENTION

It is accordingly an object of this invention to provide a more effective and economical fire retarding system comprising novel combinations of halogen-containing hydrocarbons with a low cost metal oxide.

It is another object of this invention to increase resistance to flame and combustion in flame retarded polymeric compositions through the use of an improved fire retarding system of reduced material costs and thereby improve effectiveness while providing a savings in materials.

It is also an object of this invention to provide new and improved polymeric compositions, and products thereof, of improved resistance to flame and combustion and method for producing the compositions.

It is a further object of this invention to provide electrical conductors with polymeric insulations of improved resistance to flame and combustion, at lower costs.

BRIEF DESCRIPTION OF THE DRAWING

The drawing comprises a perspective view illustrating an insulated conductor product manufactured according to this invention.

DESCRIPTION OF PREFERRED EMBODIMENTS

This invention comprises the replacement, or supplementation, of antimony compounds, such as oxides or halides of antimony, or other metal compound equivalents therefor, in fire retarding systems of halogen-containing hydrocarbons, with more effective and lower cost components comprising particulate ferric oxide, and ferrous oxide, or mixtures thereof. The improvements and advantages of this invention are derived from both the discovered superior effectiveness of the oxides of iron in combination with a halogen-containing hydrocarbon as a fire retarding system whereby increased resistance to flame and combustion is attained, and the generally lower costs of oxides of iron as compared with the cost of antimony compounds and many of their equivalents in the prior art.

The enhanced fire retarding systems of this invention include the new combinations of oxides of iron, and mixtures thereof, with the halogen-containing materials which had heretofore been used in fire retarding systems with antimony compounds or their equivalents, including the halogenated hydrocarbons of U.S. Pat. No. 2,480,298 and the other prior art patents cited above. For example, conventional halogenated hydrocarbons for flame resistance comprise chlorinated parrafin, chlorinated propanes, chlorinated propylenes, hexachloroethane, chlorinated polythene, chlorinated polyisobutylene, polyvinyl chloride, polyvinylidene chloride, after-chlorinated polyvinyl chloride, chlorinated polyphenyls, chlorinated naphthalenes, hexachlorobenzene, chlorinated indenes, chlorinated polystyrenes, chlorinated diphenyl alkanes, and their brominated or other halogenated equivalents such as hexabromobiphenyl, decabromobiphenyl or decabromobiphenyl oxide. Also included as conventional halogenated hydrocarbons are proprietary halogenated flame retardants such as Hooker Chemical Company's Dechlorane Plus 515, Dimond Alkali Company's Chlorowax, and similar products.

The proportions of the ingredients of the novel combinations comprising the fire retarding systems of this invention, and also the amounts of the combinations of the system added to polymer compositions can vary considerably and depend primarily upon the degree of resistance to flame or combustion required or desired, and also upon the combustion characteristics of the particular polymeric composition treated. However, with the fire retarding systems of this invention, typical amounts of the oxides of iron for dispersion through a polymeric composition comprise approximately 5 to 10 percent by weight thereof based upon the total weight of the combustible components of the overall polymeric composition. Moreover, inasmuch as the components of this invention are more effective in the fire retarding systems than antimony compounds, the amounts of iron oxides can be reduced from the proportions of antimony previously used to achieve equivalent levels of resistance to flame and fire, or similar amounts of iron oxides to those of former antimony use can be employed with attendant increases in resistance to flame and fire. Generally, amounts of particulate iron oxides of from at least about 3 percent up to about 15 percent by weight, based upon the total weight of the combustible components of the overall polymeric composition, will suffice in most applications and provide the prerequisite level of flame resistance. The oxide of iron can be present in the amount of at least 5 percent by weight of the organic content of the composition.

The proportions of the halogen-containing material of the novel combinations of the improved fire retarding systems of this invention are generally the same as employed in the prior art systems containing antimony compounds. Moreover, as is well known and appreciated in the art, since it is the halogen of this component of the system which provides the resistance to flame and combustion, supplemented or enhanced by the presence of an antimony or other metal component, the amount of a halogen-containing material utilized depends upon the content or proportion of halogen in such a material and its availability at flame or combustion temperatures as well as the degree of flammability of a given polymeric composition and the level of resistance to flame and combustion desired or required therefor. Generally, overall bromine contents of within the approximate range of about 8 to 50 percent by weight thereof based upon the total weight of the combustible ingredients of the polymeric compositions provide effective levels of resistance to flame and combustion when combined with the metal oxides of this invention. Frequently about 15 to 35 percent by weight of overall bromine content will serve most applications. The bromine-containing hydrocarbon can be present in an amount sufficient to provide at least about 15 percent by weight of bromine based upon the organic content of the composition.

The following examples and data derived from a comparative evaluation of several fire retarding systems and ingredients, including the system of this invention comprising the replacement of antimony trioxide with smaller proportions of the lower cost iron oxides, when applied to common crosslink cured polyethylene compositions with a typical bromine-containing hydrocarbon, demonstrate the relative effectiveness of such systems and the advantages and improvements of this invention.

The polymeric composition employed to evaluate the effects of oxides of iron upon fire retarding systems with a halogen-containing material, consisted of the cured product of the following typical curable compound formulation given in relative parts by weight: Low density polyethylene—500 parts; Antioxidant, polymerized 1,2-trimethyl-2,2,4 dihydroquinoline (Agerite Resin D, R. T. Vanderbilt Company)—5 parts; Curing coagent, triallyl cyanurate—5 parts; and Peroxide curing agent, di-α-cumyl peroxide (Di Cup R, Hercules Company)—17.5 parts.

To provide the halogen-containing material for the fire retarding systems evaluated within the given polyethylene composition, 100 parts by weight of a brominate flame retardant was combined with the said polyethylene formulation.

The flame resistance of the foregoing polyethylene composition containing 100 parts by weight of a brominated flame retardant as a standard, and also this base composition including an oxide of this invention, were each measured by the Oxygen Index Test (ASTM D-2863-70). The bromine-containing materials added to the given base composition providing the standard, and the oxygen index values of the standard alone and including the added iron oxides in the amounts specified are all given in the following table of the fire retarding systems and their relative resistance to flame. All amounts of ingredients are in relative parts by weight, and in each instance the base composition is present in 627.5 parts by weight, in the relative proportions of ingredients set forth above.

|  | STANDARDS | | | EXAMPLES | | |
| --- | --- | --- | --- | --- | --- | --- |
|  | A | B | C | I | II | III |
| Polyethylene | 500 | 500 | 500 | 500 | 500 | 500 |
| Antioxidant | 5 | 5 | 5 | 5 | 5 | 5 |
| Curing Coagent | 5 | 5 | 5 | 5 | 5 | 5 |
| Peroxide Curing Agent | 17.5 | 17.5 | 17.5 | 17.5 | 17.5 | 17.5 |
| Hexabromobiphenyl | 100 | — | — | 100 | — | — |
| Decabromobiphenyl | — | 100 | — | — | 100 | — |
| Decabromobiphenyl Oxide | — | — | 100 | — | — | 100 |
| $Fe_2O_3$ (Red Oxide)* | — | — | — | 32.5 | 32.5 | 32.5 |
| Oxygen Index | 0.198 | 0.192 | 0.200 | 0.212 | 0.333 | 0.289 |

*#5560 Red Oxide - Hoover Color Company

The polyethylene compositions of the standard and also including the additives of each examples were all prepared and heat cured with the peroxide curing agent in an identical manner. That is all ingredients of the formulation, except the peroxide curing agent were first blended by mixing at a roll temperature of about 200° F. for a period of about 10 minutes on a two roll rubber mill, then the peroxide curing agent was added and mixing continued at a temperature of 200° F. for 3 minutes. Equal quantities of the blended composition of the standard and each sample was molded at about 1300 psi and 350° F. for about 45 minutes, thereby crosslink curing the polyethylene with the peroxide agent, and forming a test specimen measuring 4½ inch×4½ inch for evaluation of its flame resistance by the oxygen index test procedure.

The improved, and more economical fire retarding systems comprising oxides of iron of this invention are particularly applicable to polyolefin polymeric materials and compositions, either cured or uncured, comprising ethylene-containing polymers such as polyethylene, copolymers of ethylene and other polymerizable materials, and blends of polymers or copolymers of ethylene with other polymeric materials such as ethylene-vinyl acetate, copolymers of ethylene and propylene and terpolymers of ethylene and propylene with a diene and the like.

The flame retarded polymeric compositions of this invention are suitable for use in the formation of a variety of products and articles wherein resistance to flame is a factor. The compositions provided by this invention are particularly useful as flame resistant dielectric insulations and jackets for wire and cable and other electrical conductors.

A typical flame resistant polymeric insulated electrical conductor product containing the novel combination of ingredients of the improved fire retarding system of this invention is illustrated in the drawing. Referring to the drawing, the flame resisting insulated product 10 comprises a metallic conductor, composed of either a single strand as shown or a bundle of individual strands, having an overlying electrically insulating covering 14 of a polymeric composition containing dispersed therethrough the combination of an oxide of iron with a halogen-containing hydrocarbon.

The method of rendering polymeric materials or compositions thereof resistant to flame and combustion according to this invention, comprises the addition and distribution of the components of the novel fire retarding system comprising a particulate oxide of iron with a halogen-containing hydrocarbon throughout the mass of the polymer by any suitable mixing or compounding technique or apparatus.

The flame retarded composition of this invention may also include other conventional and typical ingredients, additives and agents, depending upon the intended service of the products formed therefrom, and their required or desired properties. For example other components may comprise preservatives, lubricants, mold release agents, pigments or coloring agents, fillers, processing aids, waterproofing agents, coupling agents, and additional flame proofing materials.

Although the invention has been described with reference to certain specific embodiments thereof, numerous modifications are possible and it is desired to cover all modifications falling within the spirit and scope of this invention.

What we claim as new and desire to secure by Letters Patent of the United States is:

1. A flame resistant polymeric composition comprising an ethylene-containing polymer containing a flame retarding system consisting essentially of the combination of:
   (a) at least one bromine-containing hydrocarbon selected from the group consisting of hexabromobiphenyl, and decabromobiphenyl in an amount sufficient to provide about 8 to about 50 percent by weight of bromine based upon the organic content of the composition; and
   (b) an oxide of iron in an amount of about 3 to about 15 percent by weight of the organic content of the composition.

2. The flame resistant polymeric composition of claim 1, wherein the ethylene-containing polymer is polyethylene.

3. The flame resistant polymeric composition of claim 1 wherein the ethylene-containing polymer is crosslink cured.

4. A flame resistant polymeric composition comprising polyethylene containing a flame retarding system consisting essentially of the combination of:
   (a) at least one bromine-containing hydrocarbon selected from the group consisting of hexabromobiphenyl, and decabromobiphenyl in an amount sufficient to provide at least about 15 percent by weight of bromine based upon the organic content of the composition; and
   (b) an oxide of iron in an amount of at least about 5 percent by weight of the organic content of the composition.

5. A flame resistant polymeric composition comprising crosslink cured polyethylene containing a flame retarding system consisting essentially of the combination of:
   (a) at least one bromine-containing hydrocarbon selected from the group consisting of hexabromobiphenyl, and decabromobiphenyl in an amount sufficient to provide about 8 to about 50 percent by weight of bromine based upon the organic content of the composition; and
   (b) an oxide of iron in an amount of about 3 to about 15 percent by weight of the organic content of the composition.

6. A method of producing a flame resistant polyolefin composition comprising dispensing through said polyolefin composition a flame retarding system consisting essentially of a combination of:
   (a) at least one bromine-containing hydrocarbon selected from the group consisting of hexabromobiphenyl, and decabromobiphenyl in an amount sufficient to provide at least about 15 percent by weight of bromine based upon the organic content of the composition; and
   (b) an oxide of iron in an amount of at least about 5 percent by weight of the organic content of the composition.

7. A method of producing a flame retardant polymeric composition including an ethylene-containing polymer comprising dispensing through said composition a flame retarding system consisting essentially of a combination of:
   (a) at least one bromine-containing hydrocarbon selected from the group consisting of hexabromobiphenyl, and decabromobiphenyl in an amount sufficient to provide about 8 to about 50 percent by weight of bromine based upon the organic content of the composition; and
   (b) an oxide of iron in an amount of about 3 to about 15 percent by weight of the organic content of the composition.

* * * * *